United States Patent
Kwon et al.

(10) Patent No.: US 12,294,437 B2
(45) Date of Patent: May 6, 2025

(54) SYSTEM AND METHOD FOR LINK RECOVERY WITH DISCONTINUOUS RECEPTION

(71) Applicant: Huawei Technologies Co., Ltd., Shenzhen (CN)

(72) Inventors: Young Hoon Kwon, Laguna Niguel, CA (US); Pengfei Xia, San Diego, CA (US)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 820 days.

(21) Appl. No.: 17/257,836

(22) PCT Filed: Jan. 26, 2019

(86) PCT No.: PCT/CN2019/073276
§ 371 (c)(1),
(2) Date: Jan. 4, 2021

(87) PCT Pub. No.: WO2020/007037
PCT Pub. Date: Jan. 9, 2020

(65) Prior Publication Data
US 2021/0297139 A1    Sep. 23, 2021

Related U.S. Application Data

(60) Provisional application No. 62/793,134, filed on Jan. 16, 2019, provisional application No. 62/735,388, (Continued)

(51) Int. Cl.
| | |
|---|---|
| *H04B 7/00* | (2006.01) |
| *H04B 7/08* | (2006.01) |
| *H04L 1/00* | (2006.01) |
| *H04W 72/044* | (2023.01) |
| *H04W 72/0446* | (2023.01) |
| *H04W 72/23* | (2023.01) |

(Continued)

(52) U.S. Cl.
CPC .......... *H04B 7/088* (2013.01); *H04L 1/0061* (2013.01); *H04W 72/0446* (2013.01);
(Continued)

(58) Field of Classification Search
None
See application file for complete search history.

(56) References Cited

U.S. PATENT DOCUMENTS

| | | | |
|---|---|---|---|
| 9,974,028 B2 * | 5/2018 | Ouchi | ................... H04L 5/0053 |
| 2011/0237266 A1 | 9/2011 | Cai | |

(Continued)

FOREIGN PATENT DOCUMENTS

| | | |
|---|---|---|
| CN | 105165085 A | 12/2015 |
| CN | 105191432 A | 12/2015 |

(Continued)

OTHER PUBLICATIONS

National Taiwan University, "Beam Operation Impact for DRX in NR", 3GPP TSG RAN WG2 Meeting NR#2, R2-1707396, Jun. 27-29, 2017, 5 Pages, Qingdao, China.

*Primary Examiner* — Gerald A Smarth
(74) *Attorney, Agent, or Firm* — Slater Matsil, LLP

(57) ABSTRACT

Embodiments of the present disclosure provide an apparatus and method for beam failure recovery between a UE and a base station operating in a discontinuous reception (DRX) mode. In an embodiment, the UE receives a frame from a base station for determining a radio link quality of a physical downlink control channel (PDCCH). The UE determines whether the frame is received only during the DRX ON state of the DRX mode and that the radio link quality of the PDCCH is less than an acceptable quality threshold. In response, the UE transmits a recovery message to the base station indicating a change to a communication beam used to receive the frame.

21 Claims, 9 Drawing Sheets

Related U.S. Application Data filed on Sep. 24, 2018, provisional application No. 62/693,200, filed on Jul. 2, 2018.

(51) Int. Cl.
| | | |
|---|---|---|
| *H04W 76/19* | (2018.01) | |
| *H04W 76/28* | (2018.01) | |
| *H04W 80/02* | (2009.01) | |

(52) U.S. Cl.
CPC ......... *H04W 72/046* (2013.01); *H04W 72/23* (2023.01); *H04W 76/19* (2018.02); *H04W 76/28* (2018.02); *H04W 80/02* (2013.01)

(56) References Cited

U.S. PATENT DOCUMENTS

| | | | |
|---|---|---|---|
| 2014/0198696 A1 | 7/2014 | Li et al. | |
| 2014/0204820 A1* | 7/2014 | Wittberg | H04M 1/271 |
| | | | 370/311 |
| 2014/0269368 A1* | 9/2014 | Xu | H04W 24/00 |
| | | | 370/252 |
| 2015/0078189 A1 | 3/2015 | Kwon et al. | |
| 2017/0251518 A1 | 8/2017 | Agiwal et al. | |
| 2017/0303265 A1* | 10/2017 | Islam | H04B 7/0417 |
| 2018/0063883 A1 | 3/2018 | Nagaraja et al. | |
| 2018/0139791 A1 | 5/2018 | Bai et al. | |
| 2019/0342896 A1* | 11/2019 | Kusashima | H04W 88/02 |

FOREIGN PATENT DOCUMENTS

| | | | | |
|---|---|---|---|---|
| CN | 105191439 A | 12/2015 | | |
| CN | 108141824 A | 6/2018 | | |
| EP | 4274148 A2 * | 11/2023 | ........... | H04B 7/0695 |
| WO | 2017180335 A1 | 10/2017 | | |
| WO | 2018118409 A1 | 6/2018 | | |
| WO | WO-2019032882 A1 * | 2/2019 | ........... | H04B 7/0695 |
| WO | WO-2019099176 A1 * | 5/2019 | ........... | H04B 17/309 |

* cited by examiner

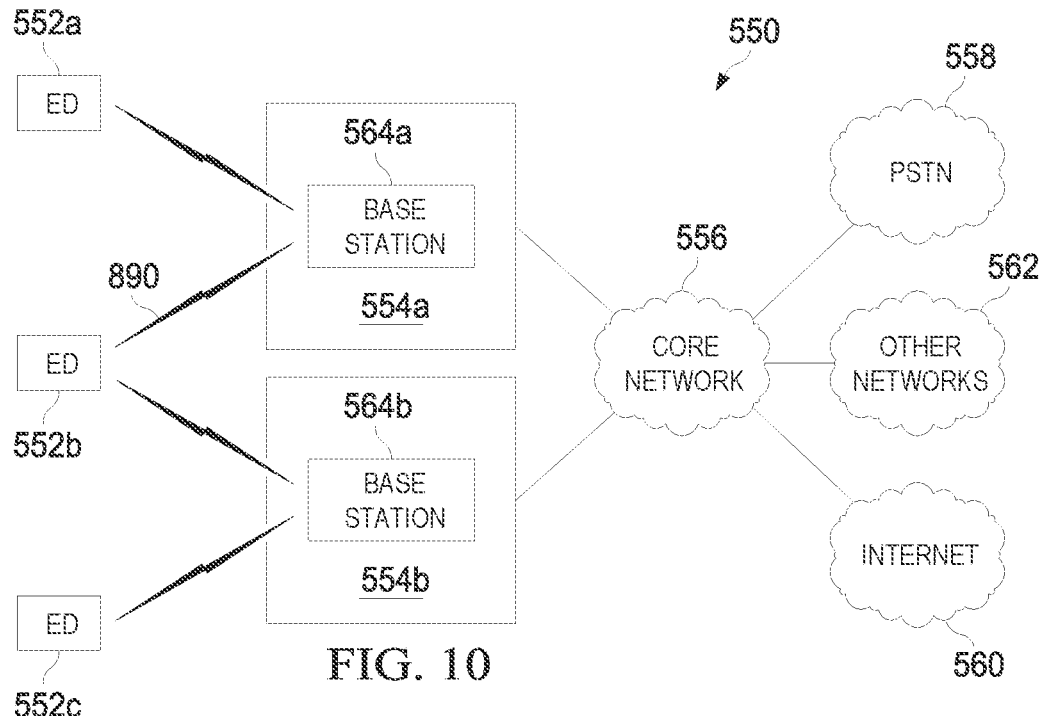
FIG. 10
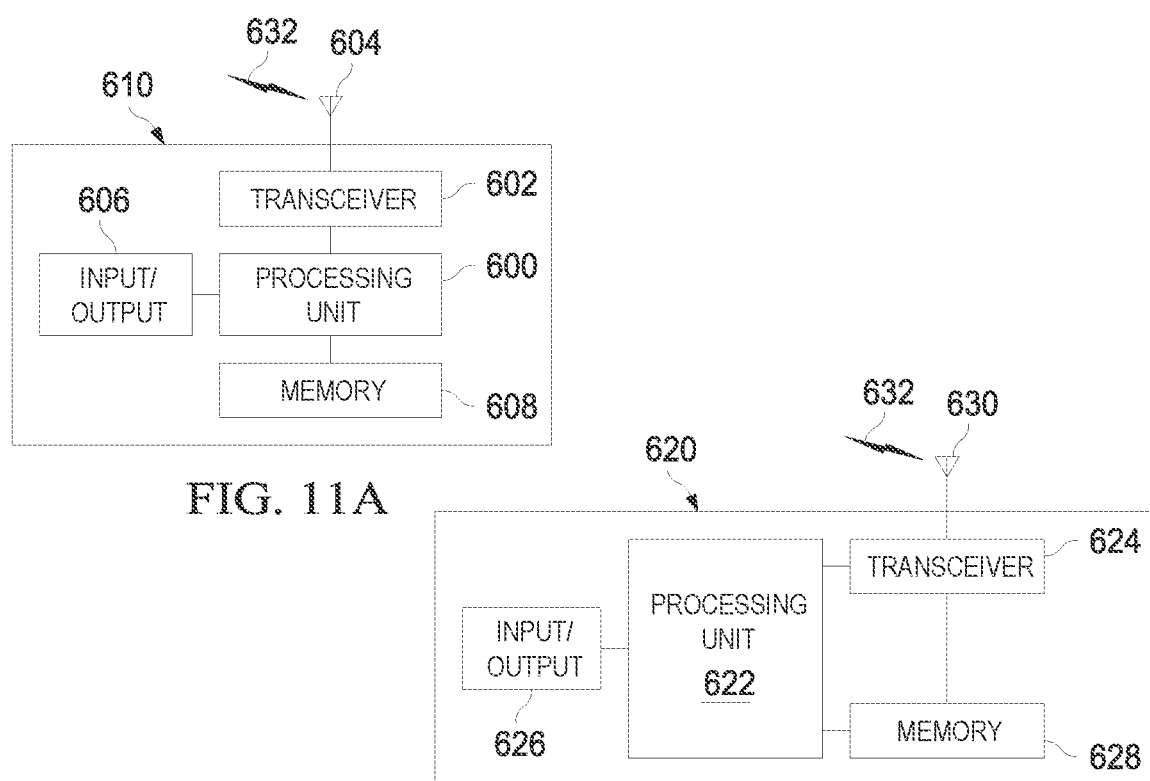
FIG. 11A
FIG. 11B

SYSTEM AND METHOD FOR LINK RECOVERY WITH DISCONTINUOUS RECEPTION

CROSS-REFERENCE TO RELATED APPLICATIONS

This patent application is a national phase filing under section 371 of PCT Application CN2019/073276 filed on Jan. 26, 2019 which claims the benefit of U.S. Provisional Application No. 62/693,200, filed on Jul. 2, 2018 and titled "System and Method for Link Recovery with Discontinuous Reception", U.S. Provisional Application No. 62/735,388, filed on Sep. 24, 2018 and titled "System and Method for Link Recovery with Discontinuous Reception", and U.S. Provisional Application No. 62/793,134, filed on Jan. 16, 2019 and titled "System and Method for Link Recovery with Discontinuous Reception". All of the aforementioned applications are hereby incorporated by reference in their entireties.

TECHNICAL FIELD

The present disclosure relates generally to wireless communications, and, in particular embodiments, to a system and method for link recovery in a wireless network.

BACKGROUND

Generally, modern wireless communication systems use multiple radio frequency (RF) chains and multiple antennas with beamforming management for improved system performance. Typically, the systems that take advantage of this technology operate at millimeter wave frequencies and above. In wireless communications, propagation loss is inversely proportional to the carrier frequency. And a larger carrier frequency leads to a greater propagation loss. To overcome these losses, beamforming techniques may be used to increase signal gain by shaping and/or alternatively directing beams used for signal transmission or reception. As beams are prone to blockage, a blocked communication beam may result in signal disconnects in the communication path.

SUMMARY

Technical advantages are generally achieved by embodiments of this disclosure, which describes a system and method for link recovery with discontinuous reception.

A first aspect relates to a method for beam recovery in a wireless communication, the method includes receiving, by a user equipment (UE) operating in a discontinuous reception (DRX) mode, a frame for determining a quality of a physical downlink control channel (PDCCH), the DRX mode having a DRX ON state and a DRX OFF state; and determining, by the UE, that the frame is received only during the DRX ON state of the UE and that the quality of the PDCCH is less than a quality threshold and, based thereon, transmitting a recovery message to a base station indicating a change to a communication beam used to receive the frame. The method facilitates an efficient solution for monitoring beam failure by only monitoring the communication beam during the DRX ON state of the DRX mode cycle.

In a first implementation form of the method according to the first aspect as such, the frame is a downlink control indicator (DCI) message received over the PDCCH, and wherein the DCI message is scrambled using cyclic redundancy check (CRC) parity bits, a radio network temporary identifier (RNTI) assigned to the UE, and a channel measurement mask.

In a second implementation form of the method according to the first aspect as such or any preceding implementation form of the first aspect, the method further includes decoding, by the UE, the DCI message using a channel measurement mask.

In a third implementation form of the method according to the first aspect as such or any preceding implementation form of the first aspect, the channel measurement mask is a first channel measurement mask, and wherein a successful decoding of the DCI message using the first channel measurement mask indicates to the UE to only measure the quality of the PDCCH.

In a fourth implementation form of the method according to the first aspect as such or any preceding implementation form of the first aspect, the channel measurement mask is a second channel measurement mask, wherein a successful decoding of the DCI message using the second channel measurement mask indicates to the UE to measure the quality of the PDCCH, and wherein the DCI message includes a payload for scheduling an uplink message, an instruction for scheduling a downlink message, or a combination thereof.

In a fifth implementation form of the method according to the first aspect as such or any preceding implementation form of the first aspect, the frame is received at a predetermined time that is indicated to the UE by the base station.

In a sixth implementation form of the method according to the first aspect as such or any preceding implementation form of the first aspect, the frame is received at a beginning of a DRX ON cycle of the DRX mode.

In a seventh implementation form of the method according to the first aspect as such or any preceding implementation form of the first aspect, a second frame is received, during an OFF state of the UE, for determining a quality of the PDCCH, is disregarded by the UE.

In an eight implementation form of the method according to the first aspect as such or any preceding implementation form of the first aspect, the communication beam is beam pair link (BPL) between a transmitting beam of the base station and a receiving beam of the UE.

In a ninth implementation form of the method according to the first aspect as such or any preceding implementation form of the first aspect, the UE is operating under a DRX operation having a long DRX cycle.

In a tenth implementation form of the method according to the first aspect as such or any preceding implementation form of the first aspect, the UE is operating under a DRX operation having a short DRX cycle.

In an eleventh implementation form of the method according to the first aspect as such or any preceding implementation form of the first aspect, the UE is operating under a DRX operation having a short DRX cycle and a long DRX cycle.

In a twelfth implementation form of the method according to the first aspect as such or any preceding implementation form of the first aspect, the frame is received periodically, by the UE, during a DRX ON period of a DRX cycle.

In a thirteenth implementation form of the method according to the first aspect as such or any preceding implementation form of the first aspect, a period of the frame is an integer multiple of the DRX cycle.

In a fourteenth implementation form of the method according to the first aspect as such or any preceding implementation form of the first aspect, a period of the frame is shorter than the DRX cycle.

In a fifteenth implementation form of the method according to the first aspect as such or any preceding implementation form of the first aspect, the frame is received, by the UE, at least once during a DRX ON state of the DRX cycle.

In a sixteenth implementation form of the method according to the first aspect as such or any preceding implementation form of the first aspect, transmitting the recovery message includes transmitting the recovery message over a contention-free physical random access channel (PRACH), a contention-based PRACH, or a physical uplink control channel (PUCCH).

In a seventeenth implementation form of the method according to the first aspect as such or any preceding implementation form of the first aspect, the recovery message is a beam failure recovery request message.

In an eighteenth implementation form of the method according to the first aspect as such or any preceding implementation form of the first aspect, the method further includes monitoring, by the UE, a quality of a demodulation-reference signal (DM-RS) of the PDCCH reception only during the DRX ON state of the UE; and determining, by the UE, that a quality of the PDCCH is less than a quality threshold, the determining only in accordance with a periodic channel status information-reference signal (CSI-RS) configuration quasi co-located with the DM-RS of the PDCCH reception and, based thereon, transmitting a second recovery message to the base station indicating a change to the communication beam used for the PDCCH reception.

In a nineteenth implementation form of the method according to the first aspect as such or any preceding implementation form of the first aspect, the method further includes monitoring, by the UE, a quality of a demodulation-reference signal (DM-RS) of the PDCCH reception only during the DRX ON state of the UE; and determining, by the UE, that a quality of the PDCCH is less than a quality threshold, the determining only in accordance with a synchronization signal (SS)/physical broadcast channel (PBCH) block quasi co-located with the DM-RS of the PDCCH reception and, based thereon, transmitting a second recovery message to a base station indicating a change to a communication beam used for the PDCCH reception.

In a twentieth implementation form of the method according to the first aspect as such or any preceding implementation form of the first aspect, the DRX ON state is a time period that a media access control (MAC) entity of the UE is in Active Time.

In a twenty-first implementation form of the method according to the first aspect as such or any preceding implementation form of the first aspect, the DRX ON state is a time period starting from a predetermined time prior to the media access control (MAC) entity of the UE being in Active Time and ending at a time that the MAC entity of the UE is no longer in Active Time.

In a twenty-third implementation form of the method according to the first aspect as such or any preceding implementation form of the first aspect, the method further includes receiving, by the UE, the pre-determined time from the base station.

A second aspect relates to a method for beam recovery in a wireless communication, the method includes receiving, by a user equipment (UE) operating in a discontinuous reception (DRX) mode, reference signals over a communication beam for determining a quality of the communication beam, the DRX mode having a DRX ON state and a DRX OFF state; and determining, by the UE, that the reference signals are received only during the DRX ON state of the UE and that the quality of the communication beam is less than a quality threshold and, based thereon, transmitting a recovery message to a base station indicating a change to the communication beam.

In a first implementation form of the method according to the second aspect as such, the DRX ON state is a time period that a media access control (MAC) entity of the UE is in Active Time.

In a second implementation form of the method according to the second aspect as such or any preceding implementation form of the second aspect, the DRX ON state is a time period starting from a predetermined time prior to the media access control (MAC) entity of the UE being in Active Time and ending at a time that the MAC entity of the UE is no longer in Active Time.

In a third implementation form of the method according to the second aspect as such or any preceding implementation form of the second aspect, the method further includes receiving, by the UE, the pre-determined time from the base station.

In a fourth implementation form of the method according to the second aspect as such or any preceding implementation form of the second aspect, the reference signals are received at a predetermined time that is indicated to the UE by the base station.

In a fifth implementation form of the method according to the second aspect as such or any preceding implementation form of the second aspect, the reference signals are received at a beginning of a DRX ON cycle of the DRX mode.

In a sixth implementation form of the method according to the second aspect as such or any preceding implementation form of the second aspect, a second set of reference signals received, during an OFF state of the UE, for determining a quality of the communication beam, is disregarded by the UE.

In a seventh implementation form of the method according to the second aspect as such or any preceding implementation form of the second aspect, the communication beam is beam pair link (BPL) between a transmitting beam of the base station and a receiving beam of the UE.

In an eight implementation form of the method according to the second aspect as such or any preceding implementation form of the second aspect, the UE is operating under a DRX operation having a long DRX cycle.

In a ninth implementation form of the method according to the second aspect as such or any preceding implementation form of the second aspect, the UE is operating under a DRX operation having a short DRX cycle.

In a tenth implementation form of the method according to the second aspect as such or any preceding implementation form of the second aspect, the UE is operating under a DRX operation comprising a short DRX cycle and a long DRX cycle.

In an eleventh implementation form of the method according to the second aspect as such or any preceding implementation form of the second aspect, the reference frames are received periodically, by the UE, during a DRX ON period of a DRX cycle.

In a twelfth implementation form of the method according to the second aspect as such or any preceding implementation form of the second aspect, a period corresponding to the reference signals is an integer multiple of the DRX cycle.

In a thirteenth implementation form of the method according to the second aspect as such or any preceding implementation form of the second aspect, a period corresponding to the reference signals is shorter than the DRX cycle.

In a fourteenth implementation form of the method according to the second aspect as such or any preceding implementation form of the second aspect, the reference signals are received, by the UE, at least once during a DRX ON state of the DRX cycle.

In a fifteenth implementation form of the method according to the second aspect as such or any preceding implementation form of the second aspect, transmitting the recovery message includes transmitting the recovery message over a contention-free physical random access channel (PRACH), a contention-based PRACH, or a physical uplink control channel (PUCCH).

In a sixteenth implementation form of the method according to the second aspect as such or any preceding implementation form of the second aspect, the recovery message is a beam failure recovery request message.

A third aspect relates to a user equipment (UE) operating in a discontinuous reception (DRX) mode, the UE includes a non-transitory memory storage comprising instructions; and one or more processors in communication with the non-transitory memory storage, wherein the one or more processors execute the instructions to receive a frame for determining a quality of a physical downlink control channel (PDCCH), the DRX mode having a DRX ON state and a DRX OFF state; and determine that the frame is received only during the DRX ON state of the UE and that the quality of the PDCCH is less than a quality threshold and, based thereon, transmitting a recovery message to a base station indicating a change to a communication beam used to receive the frame.

A fourth aspect relates to a user equipment (UE) operating in a discontinuous reception (DRX) mode, the UE includes a non-transitory memory storage comprising instructions; and one or more processors in communication with the non-transitory memory storage, wherein the one or more processors execute the instructions to receive reference signals over a communication beam for determining a quality of the communication beam, the DRX mode having a DRX ON state and a DRX OFF state; and determine that the reference signals are received only during the DRX ON state of the UE and that the quality of the communication beam is less than a quality threshold and, based thereon, transmitting a recovery message to a base station indicating a change to the communication beam.

The base station and the UE can be programmably arranged to perform a computer program of the embodiments disclosed. Embodiments can be implemented in hardware, software or in any combination thereof.

BRIEF DESCRIPTION OF THE DRAWINGS

For a more complete understanding of the present disclosure, and the advantages thereof, reference is now made to the following descriptions taken in conjunction with the accompanying drawings, in which:

FIG. 10 is a diagram of an embodiment communication system;

FIG. 11A is a diagram of an embodiment electronic device;

FIG. 11B is a diagram of an embodiment base station;

DETAILED DESCRIPTION OF ILLUSTRATIVE EMBODIMENTS

Figure 1:
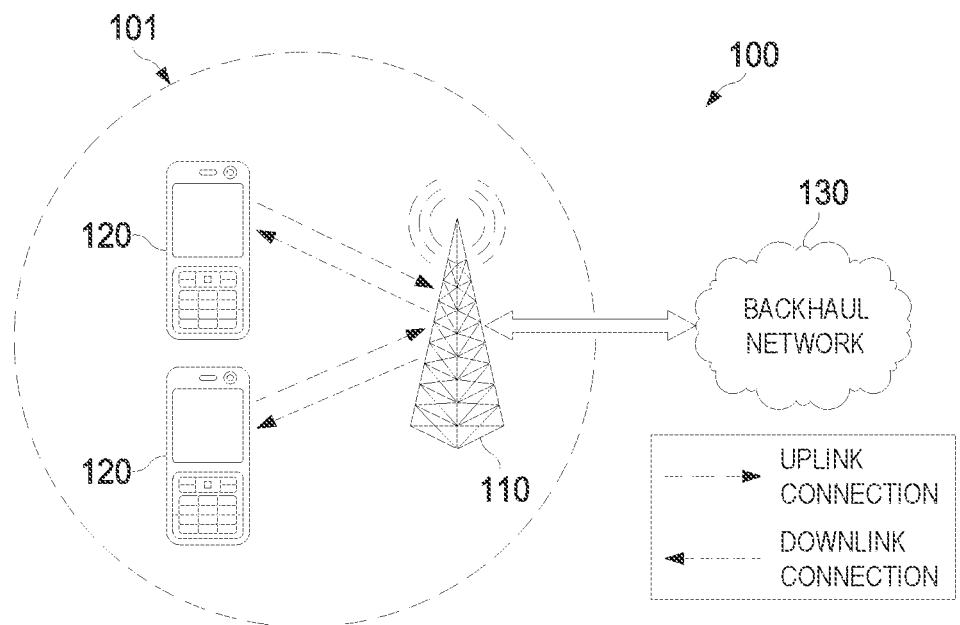
FIG. 1 is a diagram of an embodiment wireless communications network.

This disclosure provides many applicable inventive concepts that can be embodied in a wide variety of specific contexts. The specific embodiments are merely illustrative of specific configurations and do not limit the scope of the claimed embodiments. Features from different embodiments may be combined to form further embodiments unless noted otherwise. Variations or modifications described with respect to one of the embodiments may also be applicable to other embodiments. Further, it should be understood that various changes, substitutions, and alterations can be made herein without departing from the spirit and scope of this disclosure as defined by the appended claims. While the inventive aspects are described primarily in the context of 5G wireless networks, it should also be appreciated that these inventive aspects may also be applicable to 4G, 3G, and other wireless networks.

5G New Radio (NR) wireless communication networks provide support for simultaneous communication streams in both downlink and uplink channel paths. A user equipment (UE), capable of operating within the 5G NR network, is configured to receive and transmit communication signals over multiple beams formed between the UE and a base station. A communication beam pair link is formed between the base station and the UE for data communication. For a variety of reasons, for example due to signal blockage or UE mobility, the radio link quality of the beam pair link may fall below an acceptable quality threshold or become unavailable. Accordingly, techniques and methods for beam failure recovery between a UE and a base station are desired.

Embodiments of this disclosure provide techniques for beam failure recovery between a UE and a base station operating in a discontinuous reception (DRX) mode. In particular, in an embodiment, the UE may receive a frame from a base station for determining a radio link quality of a physical downlink control channel (PDCCH). The UE may then determine that the frame is received only during the DRX ON state of the DRX mode and that the radio link quality of the PDCCH is less than an acceptable quality threshold. In some embodiments, the UE may receive the frame during the DRX ON state or during the DRX OFF state. However, the UE is configured to only consider a frame received during the DRX ON state. In response, the UE may transmit a recovery message to the base station indicating a change to a communication beam used to receive the frame. In one embodiment, the frame may be a downlink control indicator (DCI) message received over the PDCCH. In one embodiment, the frame may be scrambled using cyclic redundancy check (CRC) parity bits, a radio network temporary identifier (RNTI) assigned to the UE, and a channel measurement mask. The UE, upon receiving the frame, may decode the frame using one or more channel measurement masks. In one embodiment, the successful decoding of the frame using a first channel measurement mask indicates to the UE to only measure the quality of the PDCCH. In another embodiment, the successful decoding of the frame, using a second channel measurement mask, indicates to the UE to measure the quality of the PDCCH and that the frame includes a payload for scheduling an uplink message, an instruction for scheduling a downlink message, a combination thereof, or other information. In another embodiment, the DCI message indicates that the frame is only for channel measurement. In yet another embodiment, the DCI message indicates that the frame is for channel measurement and also includes a payload. The payload may be for scheduling an uplink message, a downlink message, a combination thereof, or other information.

In one embodiment, the communication beam may be a beam pair link (BPL) between a transmitting beam of the base station and a receiving beam of the UE. The UE may be operating under a DRX operation comprising a long DRX cycle, a short DRX cycle, a long DRX cycle and a short DRX cycle, or a combination thereof. In various embodiments, the UE may receive the frame periodically during a DRX ON state of the DRX cycle. The period of the frame may be an integer multiple of the DRX cycle or may be shorter than the DRX cycle. The UE may receive the frame at least once in each DRX ON state of the DRX cycle. The recovery message may be a beam failure recovery request message transmitted over a contention-free physical random access channel (PRACH), a contention-based PRACH, or a physical uplink control channel (PUCCH). In some embodiments, the frame may be received at a predetermined time indicated by the base station to the UE. In other embodiments, the frame may be received at a beginning of a DRX ON cycle of the DRX mode. The UE may receive a second frame during a DRX OFF state of the DRX mode for determining the radio link quality of the PDCCH. However, as the UE determines that the second frame is received during the DRX OFF state, the second frame is disregarded.

In another embodiment, the UE may receive reference signals from a base station over a communication beam used for determining a radio link quality of the communication beam. The UE may then determine that the reference signals are received only during the DRX ON state of the DRX mode and that the radio link quality of the communication beam is less than an acceptable quality threshold. In some embodiments, the UE may receive the reference signals during the DRX ON state and in other embodiments, the UE may receive the reference signals during the DRX OFF state. However, the UE is configured to only consider reference signals received during the DRX ON state. As a result of the determining that the radio link quality is below the acceptable quality threshold, the UE may then transmit a recovery message to a base station indicating a change to a communication beam used for the PDCCH reception. In yet another embodiment, the UE may monitor a quality of a demodulation-reference signal (DM-RS) of a PDCCH reception during the DRX ON state of the UE. In some embodiments, the UE may monitor the quality of a reference signal quasi co-located with the DM-RS of the PDCCH. The UE may then determine that a radio link quality of the PDCCH is less than a quality threshold. In one such embodiment, the determining being made only in accordance with a periodic CSI-RS configuration quasi co-located with the DM-RS of the PDCCH reception. In another embodiment, the determining being made only in accordance with a synchronization signal (SS)/physical broadcast channel (PBCH) block quasi co-located with the DM-RS of the PDCCH reception.

The various embodiment techniques advantageously enable the UE to operate at a lower power level during the DRX OFF state of the DRX cycles, resulting in an improvement in power efficiency. These and other aspects are discussed in greater detail below.

FIG. 1 is diagram of a network 100 for communicating data. The network 100 includes a base station 110 having a coverage area 101, a plurality of UEs 120, and a backhaul network 130. As shown, the base station 110 establishes uplink (dashed line) and/or downlink (dotted line) connections with the UEs 120, which serve to carry data from the UEs 120 to the base station 110 and vice-versa. Data communicated over the uplink/downlink connections may include data communicated between the UEs 120, as well as data communicated to/from a remote-end (not shown) by way of the backhaul network 130. As used herein, the term "base station" refers to any network-side device configured to provide wireless access to a network, such as an enhanced Node B (eNodeB or eNB), a gNB, a transmit/receive point (TRP), a macro-cell, a femtocell, a Wi-Fi Access Point (AP), and other wirelessly enabled devices. Base stations may provide wireless access in accordance with one or more wireless communication protocols, e.g., 5th generation new radio (5G NR), LTE, LTE advanced (LTE-A), High Speed Message Access (HSPA), Wi-Fi 802.11a/b/g/n/ac, etc. As used herein, the term "UE" refers to any user-side device configured to access a network by establishing a wireless connection with a base station, such as a mobile device, a mobile station (STA), a vehicle, and other wirelessly enabled devices. In some embodiments, the network 100 may include various other wireless devices, such as relays, low power nodes, etc.

Figure 2:
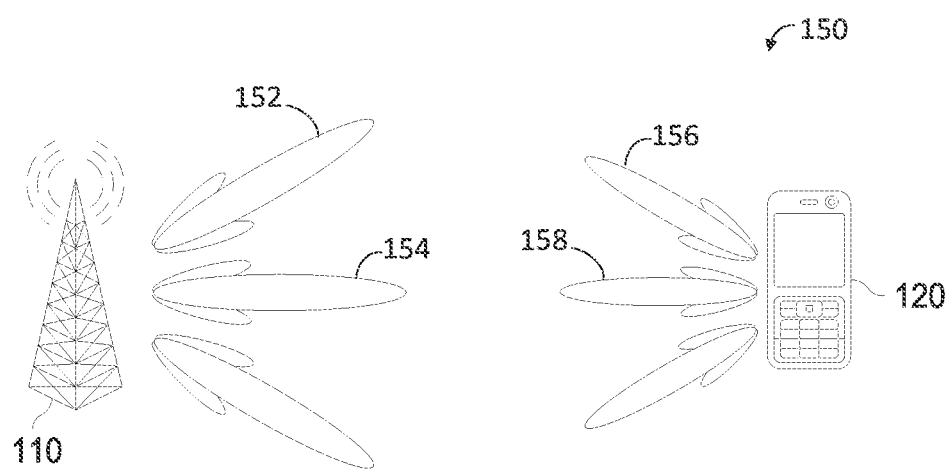
FIG. 2 is a diagram of an embodiment communications system including beamforming beams.

FIG. 2 illustrates a diagram of an embodiment communications system 150 used for wireless communication using beamforming beams, for example, between a base station 110 and a UE 120. The embodiment communications system 150 may operate over a variety of frequencies, for example, at or above 6 gigahertz (GHz) (e.g., the millimeter wave (mmWave) frequency spectrum). In such an embodiment, the beamforming may be used to overcome the high path loss typically present at high frequencies. The base station 110 may communicate with the UE 120, or any other device, using one or more communication beams, such as beams 152 and/or 154. The UE 120 in turn may communicate with the base station 110, or any other device, using one or more communication beams, such as beams 156 and/or 158.

Figure 3:
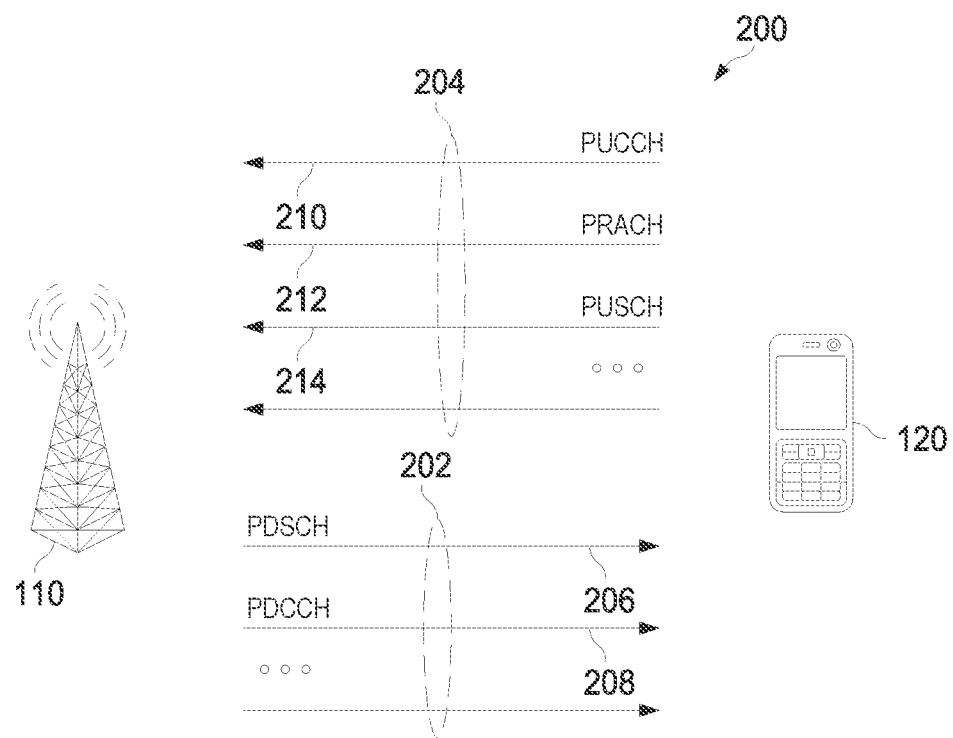
FIG. 3 is a diagram of an embodiment channel structure between a base station and a user equipment (UE)

FIG. 3 illustrates an embodiment communications system 200 highlighting an example channel structure, for example, between the base station 110 and the UE 120. In a bi-directional communications implementation, the base station 110 and the UE 120 are in communication through a downlink channel 202 and an uplink channel 204. In some embodiments, the downlink channel 202 and the uplink channel 204 may each include multiple uni-directional channels. The downlink channel 202 may include a physical downlink shared channel (PDSCH) 206 and a physical downlink control channel (PDCCH) 208. The uplink channel 204 may include a physical uplink control channel (PUCCH) 210, a physical random access channel (PRACH) 212, and a physical uplink shared channel (PUSCH) 214. The downlink channel 202 and uplink channel 204 may include other channels.

Figure 4:
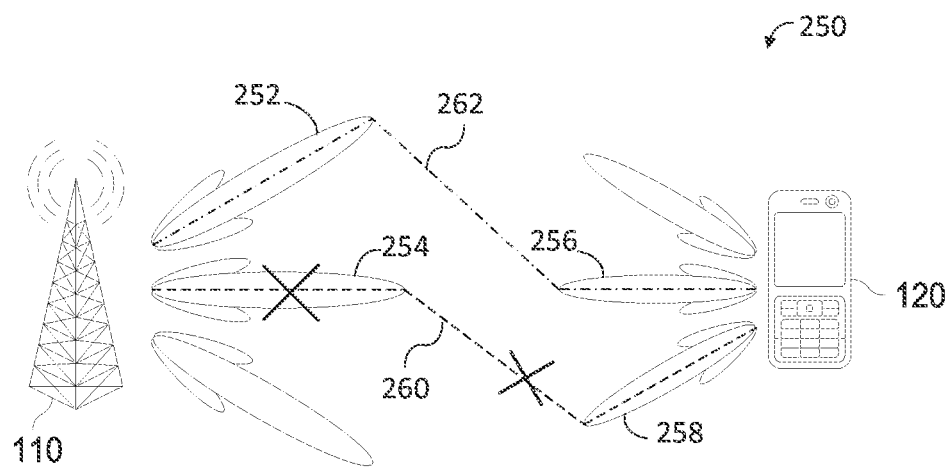
FIG. 4 is a diagram of an embodiment communications system including beamforming beams highlighting beam failure and beam recovery.

FIG. 4 illustrates an embodiment wireless communications system 250 highlighting beam failure and beam failure recovery. The wireless communications system 250 includes a base station 100 serving a UE 120. Both base station 100 and UE 120 communicate using beamformed transmission and reception beams. The base station 110 may communicate with the UE 120 or any other device using one or more communication beams, such as beams 252 and/or 254. The UE 120 may communicate with the base station 110 or any other device using one or more communication beams, such as beams 256 and/or 258. In an initial configuration, the base station 110 and the UE 120 may communicate using a beam pair link (BPL) 260. The beam pair link 260 is a beamformed communication link formed by beams 254 and 258. In some instances, the beam pair link 260 may become unavailable or experience a reduced radio link quality that is unacceptable for data exchange, for example due to a blockage or due to UE mobility. As a result, the UE 120 may detect candidate beam 252, originating from base station 110, to replace the failed beam 254. In an embodiment, the UE 120 initiates a beam fail recovery mode by sending a beam failure recovery request (BRFQ) to the base station 110. At the completion of the beam failure recovery process a new beam pair link, for example a beam pair link 262 formed by beams 252 and 256, may be established for the communication between the UE 120 and the base station 110.

It may be said that two or more reference signals, data signals, and/or resources have a quasi co-located (QCL) relationship when they share a similar characteristic. The similar characteristic may be with respect to time, frequency, code, and or a spatial relationship. When the similar characteristic is in the context of a spatial relationship, the relationship may be referred to as a spatial quasi co-located relationship. The spatial quasi co-located relationship information can be stored in tabular form or in a memory of a device. In an embodiment, the spatial quasi co-located relationship information may be used by the UE to determine CSI-RS beam indices from WBRS beam indices, and vice versa. In one embodiment, in a one to one association, each CSI-RS signal may be associated with one WBRS such that the transmit precoder for the CSI-RS signal may be the same as a transmit precoder for the WBRS. In another embodiment, each CSI-RS signal may be associated with one WBRS such that the transmit precoder for the CSI-RS signal may be the same as a transmit precoder for the WBRS. In yet another embodiment, a first WBRS may be associated with a second WBRS such that the transmit precoder for the second WBRS may be the same as that for the first WBRS. It may also be possible that multiple CSI-RS signals can be associated with a single WBRS, and vice versa.

A discontinuous reception (DRX) operation, as proposed during the standardization activities of the $3^{rd}$ Generation Partnership Project (3GPP) NR, is used to reduce and save power consumption by the UE. The basic media access control (MAC) layer operation for DRX utilizes a multiplicity of parameters. These parameters are the duration at the beginning of a DRX cycle (drx-onDurationTimer), the delay before starting the drx-onDurationTimer (drx-SlotOffset), the defining parameter for the subframe where the DRX cycle (Long or Short) starts (drx-StartOffset), the duration after the PDCCH occasion in which a PDCCH indicates a new uplink (UL) or downlink (DL) transmission for the MAC entity (drx-InactivityTimer), the maximum duration until a downlink retransmission is received per a downlink hybrid automatic repeat request (HARQ) process (drx-RetransmissionTimerDL), the maximum duration until a grant for uplink retransmission is received per an uplink HARQ process (drx-RetransmissionTimerUL), the Long DRX cycle (drx-LongCycle), optionally the Short DRX cycle (drx-ShortCycle), optionally the duration the UE shall follow the short DRX cycle (drx-ShortCycleTimer), the minimum duration before a downlink assignment for HARQ retransmission is expected by the MAC entity per downlink HARQ process—except for the broadcast process (drx-HARQ-RTT-TimerDL), and the minimum duration before an uplink HARQ retransmission grant is expected by the MAC entity per an uplink HARQ process (drx-HARQ-RTT-TimerUL).

Active Time may refer to a time duration that a UE is in an active state and able to monitor the downlink control channels. As a first example, for a configured DRX cycle, the Active Time may include the time that the drx-onDurationTimer, drx-InactivityTimer, drx-RetransmissionTimerDL, drx-RetransmissionTimerUL, or a ra-ContentionResolutionTimer is running. In a second example, the Active Time may include the time that a scheduling request is sent on a PUCCH and the scheduling request is pending. In a third example, the Active Time may include the time that a PDCCH, indicating a new transmission addressed to the cell-radio network temporary identifier (C-RNTI) of the MAC entity, has not been received after successful reception of a Random Access Response for the Random Access Preamble not selected by the MAC entity among the contention-based Random Access Preamble. In some embodiments, a UE operating in a DRX ON state refers to a time period when the UE's MAC entity is in Active Time. However in other embodiments, the DRX ON state may refer to a time period starting from a predetermined time prior to the MAC entity being in Active Time and expiring when the UE's MAC entity is not in Active Time. The predetermined time may be indicated in a message transmitted from the base station to the UE.

In a DRX configuration, the basic MAC layer operation the conditions that:

If a MAC protocol data unit (PDU) is received in a configured downlink assignment, start the drx-HARQ-RTT-TimerDL for the corresponding HARQ process in the first symbol after the end of the corresponding transmission carrying the DL HARQ feedback. In addition, stop the drx-RetransmissionTimerDL for the corresponding HARQ process.

If a MAC PDU is transmitted in a configured uplink grant, start the drx-HARQ-RTT-TimerUL for the corresponding HARQ process in the first symbol after the end of the first repetition of the corresponding PUSCH transmission. Additionally, stop the drx-RetransmissionTimerUL for the corresponding HARQ process.

If a drx-HARQ-RTT-TimerDL expires and if the data of the corresponding HARQ process is not successfully decoded, start the drx-Retransmission TimerDL for the corresponding HARQ process in the first symbol after the expiry of the drx-HARQ-RTT-TimerDL.

If a drx-HARQ-RTT-TimerUL expires, then start the drx-RetransmissionTimerUL for the corresponding HARQ process in the first symbol after the expiry of the drx-HARQ-RTT-TimerUL.

If a DRX Command MAC CE or a Long DRX Command MAC CE is received, stop drx-onDurationTimer and stop drx-InactivityTimer.

If drx-InactivityTimer expires or a DRX Command MAC CE is received and if the Short DRX cycle is configured, start or restart drx-ShortCycleTimer in the first symbol after the expiry of drx-InactivityTimer or in the first symbol after the end of DRX Command MAC CE reception and use the Short DRX Cycle.

If drx-InactivityTimer expires or a DRX Command MAC CE is received and if the Short DRX cycle is not configured, use the Long DRX cycle.

If drx-ShortCycleTimer expires, use the Long DRX cycle.

If a Long DRX Command MAC CE is received, stop drx-ShortCycle Timer and use the Long DRX cycle.

If the Short DRX Cycle is used, and [(SFN×10)+subframe number] modulo (drx-ShortCycle)=(drx-StartOffset) modulo (drx-ShortCycle); or if the Long DRX Cycle is used, and [(SFN×10)+subframe number] modulo (drx-LongCycle)=drx-StartOffset, if drx-SlotOffset is configured, start drx-onDurationTimer after drx-SlotOffset from the beginning of the subframe.

If the MAC entity is in Active Time, monitor the PDCCH and if the PDCCH indicates a downlink transmission or if a downlink assignment has been configured start the drx-HARQ-RTT-TimerDL for the corresponding HARQ process in the first symbol after the end of the corresponding transmission carrying the downlink HARQ feedback. If the PDCCH indicates an uplink transmission start the drx-HARQ-R7TT-TimerUL for the corresponding HARQ process in the first symbol after the end of the first repetition of the corresponding PUSCH transmission and stop the drx-Retransmission Timer UL for the corresponding HARQ process. If the PDCCH indicates a new transmission (downlink or uplink), start or restart drx-InactivityTimer in the first symbol after the end of the PDCCH reception.

In current symbol n, if the MAC entity would not be in Active Time considering grants/assignments/DRX Command MAC CE/Long DRX Command MAC CE received and Scheduling Request sent 4 ms prior to symbol n when evaluating all DRX Active Time conditions do not transmit periodic SRS and semi-persistent SRS defined in TS 38.214 [7].

If the channel quality indicator (CQI) masking (cqi-Mask) is setup by upper layers, in current symbol n, if onDurationTimer would not be running considering grants/assignments/DRX Command MAC CE/Long DRX Command MAC CE received 4 ms prior to symbol n when evaluating all DRX Active Time conditions, do not report CSI on PUCCH and semi-persistent CSI on PUSCH.

Regardless of whether the MAC entity is monitoring PDCCH or not, the MAC entity transmits HARQ feedback, aperiodic CSI on PUSCH, and aperiodic SRS defined in TS 38.214 [7] when such is expected.

The MAC entity needs not to monitor the PDCCH if it is not a complete PDCCH occasion (e.g. the Active Time starts or ends in the middle of a PDCCH occasion).

Figure 5A:
FIGS. 5A-B are timeline diagrams of an embodiment discontinuous reception (DRX) operation.
Figure 5B:
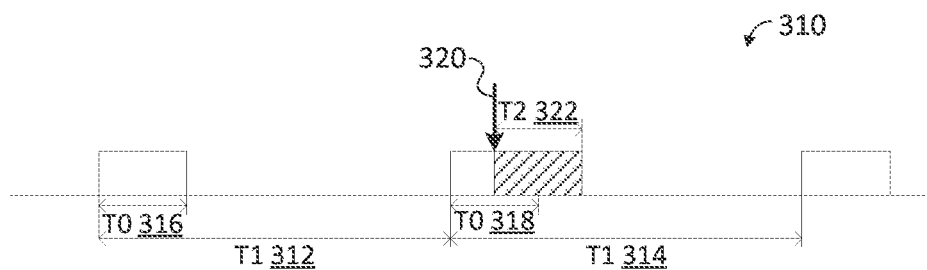

FIGS. 5A-B illustrate diagrams 300 and 310 of an embodiment of DRX operation based on the above mentioned MAC procedure. As shown, a UE may switch between a DRX ON state and a DRX OFF state in a DRX cycle. When the UE is in the DRX ON state, the UE may monitor a wireless channel for control channel reception and/or frame exchange. When the UE is in the DRX OFF state, the UE may not be required to monitor the wireless channel based on the assumption that a serving base station will not initiate data transmission during the DRX OFF state.

FIG. 5A illustrates a diagram 300 of a case where only a Long DRX Cycle (drx-LongCycle) is configured and the serving base station does not send a PDCCH during the DRX ON duration. At each DRX cycle T1 302-304, the UE monitors the PDCCH until the expiration of the drx-onDurationTimer. At the expiration of time duration T0 306-308 (e.g., drx-onDurationTimer expires), the UE returns to the DRX OFF state. In DRX OFF state, the UE does not monitor the wireless medium. Therefore, during Long DRX cycle time T1 302-304, the UE only monitors the wireless medium during T0 306-308, which can save power consumption at the UE.

FIG. 5B illustrates a diagram 310 of a case where only a Long DRX Cycle is configured and the serving base station sends a PDCCH during a DRX ON duration. For each DRX cycle T1 312-314, the UE monitors PDCCH during T0 316-318 until a drx-onDurationTimer expires. If a PDCCH 320 is detected before the expiration of the drx-onDurationTimer, the UE monitors the wireless medium further during T2 322 until another timer (drx-InactivityTimer) expires to check any follow up downlink transmission. When drx-InactivityTimer expires and there is no follow up data exchange, the UE goes to DRX OFF state again and is not monitoring the wireless medium.

In these embodiments, a UE can avoid continuous (i.e., both DRX ON state and DRX OFF state) PDCCH monitoring and save power consumption. For a variety of reasons, the wireless beam may be blocked during a period that the UE is not monitoring the PDCCH. As an example, when the UE is not monitoring PDCCH, if a UE moves or changes its direction, the ongoing transmit or receive beam cannot be maintained as the wireless channel has been changed.

Figure 6:
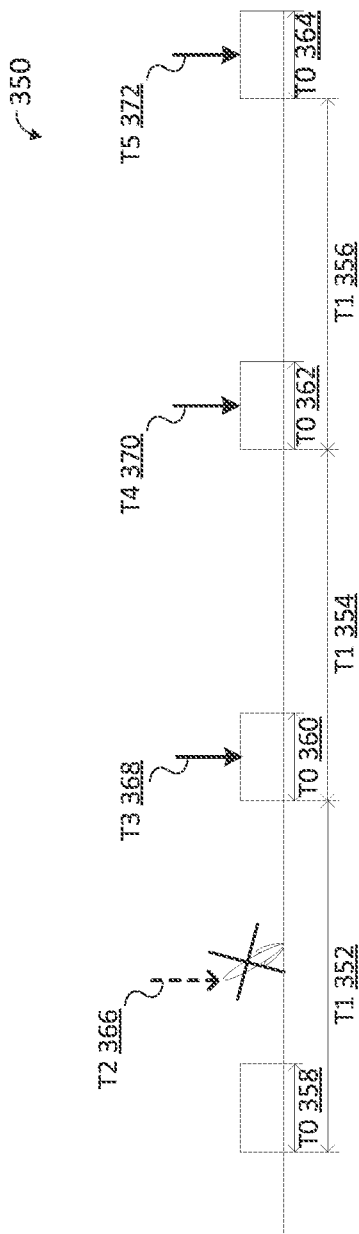
FIG. 6 is a timeline diagram of an embodiment DRX operation with a physical downlink control channel (PDCCH) blockage.

FIG. 6 illustrates a timing diagram 350 of an embodiment UE operation detailing a PDCCH beam blocking occurrence in a DRX cycle. In this example, the UE is configured for a Long DRX Cycle (drx-LongCycle). In this configuration, the UE monitors the PDCCH during the DRX ON duration. As illustrated, at each DRX cycle T1 352-356, the UE monitors the PDCCH during the time durations of T0 358-364 until a drx-onDurationTimer expires.

In this embodiment, at time T2 366 where the UE is in a DRX OFF state the beam used for PDCCH reception is blocked. As a result, the UE is unable to identify the blocking of the beam used for the PDCCH reception and continues to use the beam to monitor the PDCCH for the upcoming DRX ON durations T0 360-364. The serving base station transmits a series of PDCCHs at times T3 368, T4 370, and T5 372. Each transmission being within a respective time duration of T0 360-364 (i.e., DRX ON state). However, as the UE is unaware that the current beam used for PDCCH reception is blocked, the UE continues to use the current beam to monitor PDCCH at each time period T0 360-364. Thus, the UE is unlikely to successfully decode PDCCH transmitted from the serving base station at times T3 368, T4 370, and T5 372. As the UE is unable to successfully decode PDCCH destined to the UE during time durations of T0 360-364, the UE returns to the DRX OFF state and ceases to monitor the PDCCH.

It is noted that when a serving base station and a UE are operating in DRX mode, a frame exchange between the serving base station and the UE occurs only within a DRX ON period and no frame exchange is expected during a DRX OFF period. Moreover, in a normal operational scenario, and to save power at the UE, the time duration of a DRX OFF period is much longer than the time duration of a DRX ON period. Therefore, in the event that the UE's current beam used for PDCCH reception is blocked, due to the length in time, the impact of not successfully receiving the PDCCH sent from the serving base station can result in radio link failure.

In an embodiment, in order to ensure that the UE can switch to a new beam from the current beam used for PDCCH reception when the blocking of the UE's current beam happens before a radio link failure is declared, the UE may measure the quality of the current beam used for PDCCH reception when the UE is in a DRX ON period. According to an embodiment, when the UE identifies that a signal quality of the UE's current beam used for PDCCH reception is not acceptable during the DRX ON period, the UE may indicate to the base station that the UE's current beam used for PDCCH reception is not acceptable. The indication may trigger a procedure for updating a beam used for PDCCH reception at the UE.

In an embodiment, in order for a UE to estimate the quality of the current beam used for PDCCH reception, a base station may transmit a first frame periodically using the current beam used for a PDCCH reception during a DRX ON period (e.g., before drx-onDurationTimer expires). As the UE knows when the first frame is transmitted from the base station during a DRX ON period, the UE can measure the signal quality of the received first frame and estimate the quality of the current beam used for PDCCH reception.

In an embodiment, the time period for the transmission of the first frame is in accordance with a DRX cycle. As an example, the period of the first frame transmission may be an integer multiple of the DRX cycle. In another embodiment, the period of the first frame transmission may be shorter than a DRX cycle. In such an embodiment, the transmission of the first frame can happen during the DRX ON period and during the DRX OFF period. In such an embodiment, the UE may measure the signal quality of the first frame during the DRX ON period to estimate the quality of the current beam used for PDCCH reception. In another embodiment, a base station may transmit a PDCCH at least once during the DRX ON period (e.g., before drx-onDurationTimer expires) within a DRX cycle, in order for a UE to estimate the quality of the current beam used for PDCCH reception. In this embodiment, as PDCCH is transmitted even if there is no downlink or uplink data to be scheduled for the UE, the PDCCH may include an indication that the PDCCH is sent for channel measurement.

Figure 7:
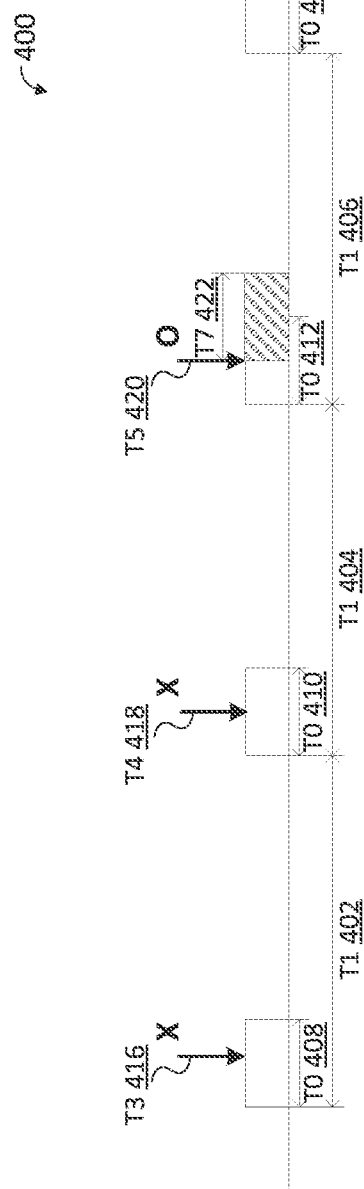
FIG. 7 is a timeline diagram of an embodiment DRX operation and a PDCCH transmission by a base station during a DRX ON state of a UE.

FIG. 7 illustrates a timing diagram 400 of an embodiment UE operation receiving a PDCCH at least once during a DRX ON period. In the embodiment operation shown in FIG. 7, only a Long DRX Cycle (drx-LongCycle) is configured for a UE. The UE monitors the PDCCH during the DRX ON duration. As illustrated, at each DRX cycle T1 402-406, the UE may monitor the PDCCH during time durations T0 408-414 until drx-onDurationTimer expires. A base station may send a PDCCH at least once before the expiration of the drx-onDurationTimer. During the first DRX ON time period (T0) 408, the base station has no downlink or uplink data to send or receive.

At time T3 416, the base station transmits a PDCCH instructing the UE to measure the control channel. The UE receives the instruction at time T3 416 using the current beam for PDCCH reception and measures the channel quality of the PDCCH. Thus, the UE is able to successfully decode the PDCCH and identify that the PDCCH at time T3 416 is for channel measurement and that the base station does not have any downlink or uplink data to send or receive. At the end of the first DRX ON time period (T0) 408 and the expiration of the drx-onDurationTimer, the UE stops the monitoring of the wireless channel. Similarly during the second DRX ON time period (T0) 410, the base station has no downlink or uplink data to send or receive.

At time T4 418, the base station transmits a PDCCH indicating to the UE instructions for channel measurement. The UE receives the instruction at time T4 418 using the current beam for PDCCH reception and measures the channel quality of the PDCCH. Thus, the UE is able to successfully decode the PDCCH and identify that the PDCCH at time T4 418 is for channel measurement and that the base station does not have any downlink or uplink data to send or receive. At the end of the second DRX ON time period T0 410 and the expiration of the drx-onDurationTimer, the UE stops the monitoring of the wireless channel. During the third DRX ON time period (T0) 412, the base station has downlink data to send.

At time T5 420, the base station transmits a PDCCH indicating to the UE that in addition to instructions to measure the channel, the base station has data to transmit. Thus, the UE receives the PDCCH at time T5 420 using the current beam for PDCCH reception. The UE then successfully decodes the PDCCH and identifies that the PDCCH is not only to be used to instruct a measurement of the channel quality but that the base station is to transmit downlink data to the UE. As the PDCCH at time T5 420 is not only for channel measurement, the UE further monitors the channel for the time duration T7 422, until the expiration of the drx-InactivityTimer. As no downlink signal is received during time period T7 422, the UE stops monitoring the wireless channel.

In an embodiment, cyclic redundancy check (CRC) parity bits of a downlink control indicator (DCI) message may be scrambled with a radio network temporary identifier (RNTI) assigned to the UE and a mask indicating that the PDCCH is for channel measurement. Upon receiving a DCI message, the UE may descramble the CRC with both the channel measurement mask and the corresponding RNTI. In the event that the CRC check passes, the UE can identify whether the received PDCCH is intended for the UE and also determine if the PDCCH is sent only for channel measurement.

Table 1 below illustrates an example channel measurement mask $<X_{CM,0}, X_{CM,1}, \ldots, X_{CM,15}>$.

TABLE 1

Channel measurement mask

| PDCCH usage | Channel measurement mask $<X_{CM,0}, X_{CM,1}, \ldots, X_{CM,15}>$ |
|---|---|
| Not only for channel measurement | <0, 0, 0, 0, 0, 0, 0, 0, 0, 0, 0, 0, 0, 0, 0, 0> |
| Only for channel measurement | <0, 0, 0, 0, 0, 0, 0, 0, 0, 0, 0, 0, 0, 0, 0, 1> |

In the event that the UE uses its RNTI and the channel measurement mask <0, 0, 0, 0, 0, 0, 0, 0, 0, 0, 0, 0, 0, 0, 0, 0> to descramble the CRC parity bits and the CRC check passes, then the UE identifies that this PDCCH is not sent only for channel measurement but also for other purposes depending on the payload of the DCI (for example, for downlink data scheduling or for uplink data scheduling). However, if the UE uses its RNTI and the channel measurement mask <0, 0, 0, 0, 0, 0, 0, 0, 0, 0, 0, 0, 0, 0, 0, 1> to descramble the CRC parity bits and the CRC check passes, then the UE identifies that this PDCCH is sent to the UE only for channel measurement.

In an embodiment, where the signal quality of a current beam for PDCCH reception from a base station is deemed to be within an unacceptable range, the UE may initiate a change of the current beam by transmitting a beam failure recovery request to the base station. As an example, the UE may transmit a beam failure recovery request in response to a measurement of the signal quality of the PDCCH reception falling below a threshold during one or more DRX ON states within DRX mode cycles. The transmission of the beam failure recovery request may be implemented as a transmission of a contention-free physical random access channel (PRACH), transmission of a contention-based PRACH, a transmission of a PUCCH, or a transmission of a scheduling request (SR) PUCCH.

The UE may transmit a contention-free PRACH based on a measurement of a radio link signal quality of the PDCCH reception during one or more DRX ON states of a DRX cycle. In some embodiments, a series of reference signals quasi co-located (QCL'ed) with the PDCCH are transmitted by a base station during both a DRX ON period and a DRX OFF period. The UE may determine a set (e.g., q0) of periodic CSI-RS resource configuration indexes and/or synchronization signal (SS)/physical broadcast channel (PBCH) block indexes. The UE determines the radio link quality only in accordance with the periodic CSI-RS resource configurations or SS/PBCH blocks quasi co-located with the demodulation-reference signal (DM-RS) of the PDCCH receptions only being monitored by the UE during the DRX ON state of the DRX cycle. In other words, the UE monitors the quality of a DM-RS of a PDCCH reception only during the DRX ON state of the UE by measuring, for example one or more reference signals and/or frames that are QCL'ed with the DM-RS of the PDCCH. The UE may then determine that the quality of the PDCCH is less than a quality threshold. In one embodiment, the determining is only in accordance with a periodic CSI-RS configuration quasi co-located with the DM-RS of the PDCCH reception. In another embodiment, the determining is only in accordance with a synchronization signal (SS)/physical broadcast channel (PBCH) block quasi co-located with the DM-RS of the PDCCH reception. Based on the determining that the radio link quality is less than an acceptable threshold, the UE may transmit a recovery message to the base station indicating a change to a communication beam used for the PDCCH reception.

In one such embodiment, a UE may separately manage a first set of beam failure detection reference signals and a second set of reference signals for a new candidate beam, when the UE is operating under a DRX mode and also when the UE is not operating under the DRX mode. As an example, a base station may configure a different set of periodic CSI-RS resource configuration indexes and/or SS/PBCH block indexes for radio link quality measurements on a serving cell when the UE is operating in a DRX mode and when the UE is not operating in the DRX mode.

In an embodiment, a UE physical layer (PHY) provides an indication to higher layers of a beam failure instance. The beam failure instance being that the radio link quality for all corresponding resource configurations in the beam failure set (e.g., q0)—the first set that the UE uses to assess a radio link quality—is worse than the a first threshold. The UE assesses the radio link quality of the received signal only during a DRX ON period while the UE is operating in a DRX mode. It should be noted that in some embodiments, the assessment of the radio quality may occur during the DRX ON state, while in other embodiments, the assessment of the radio quality may be delayed and thus occur during the DRX OFF state. The UE physical layer informs the higher layers of the beam failure instance when the radio link quality is worse than the first threshold. The periodicity is determined as the maximum between the shortest periodicity of periodic CSI-RS configurations or SS/PBCH blocks in the beam failure set and a first parameter. The higher layer of the UE declares beam failure if the number of beam failure instances informed from the UE physical layer—with the periodicity during a first duration—is over a second threshold. In one embodiment of this embodiment, the higher layer of the UE declares beam failure if a third number of consecutive beam failure instances is informed from the UE physical layer. In an embodiment of this embodiment, the first parameter is set to the DRX period (e.g., Long DRX Cycle, drx-LongCycle).

In an embodiment, when a DRX mode is configured for a UE and a MAC entity of the UE is not in Active Time, the MAC entity of the UE shall keep the current value of the BFI_COUNTER parameter. Alternatively, in another embodiment, when a DRX mode is configured for a UE and a MAC entity of the UE is not in Active Time, the MAC entity of the UE shall not update values for beam failure recovery procedure. In another embodiment, when DRX is configured for a UE and a MAC entity of the UE is not in Active Time, the MAC entity of the UE maintains current value of a beamFailureRecoveryTimer parameter, and the MAC entity resumes the beamFailureRecoveryTimer parameter when the MAC entity of the UE enters in Active Time.

Figure 8:
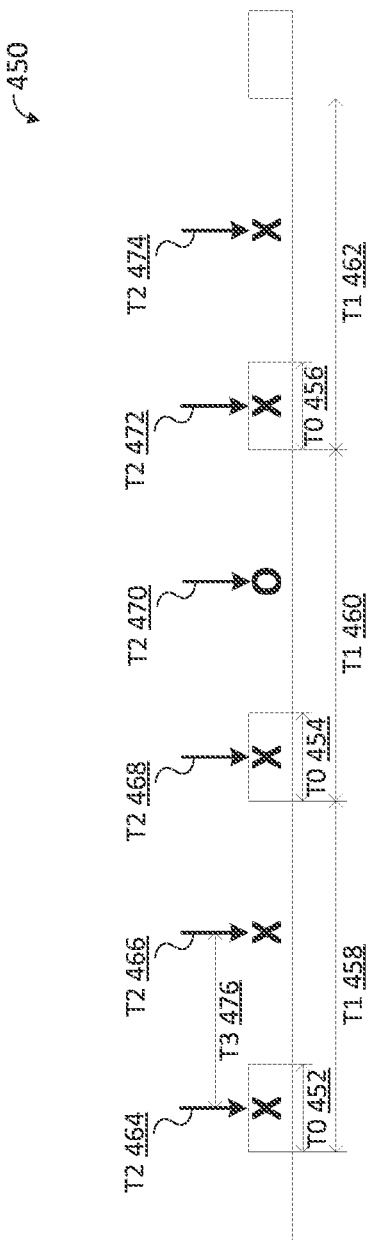
FIG. 8 is a timeline diagram of an embodiment DRX operation and a periodic channel status information-reference signal (CSI-RS) used for beam failure detection.

FIG. 8 illustrates a timing diagram 450 of an embodiment UE operation detailing a series of periodic CSI-RS used for beam failure detection in a DRX cycle. In the embodiment operation shown in FIG. 8, only a Long DRX Cycle (drx-LongCycle) is configured for a UE. It is noted that the UE monitors the PDCCH reception only during a DRX ON duration. The base station configures one periodic CSI-RS in a set (e.g., q0) for a beam failure detection reference signal. The period corresponding to the periodic CSI-RS, having a time duration T3 476, is one-half of a DRX time period T1 458, 460, and 462. It is also noted that at least one CSI-RS occurs during a DRX ON period (e.g., until drx-InactivityTimer or drx-onDurationTimer expires). The periodicity of beam failure instance indication to higher layers from a physical layer is set to DRX period T1 458, 460, and 462. The higher layers may declare a beam failure in the event that three consecutive beam failure instances have been indicated from the physical layer.

The periodic CSI-RS is transmitted from the base station at times T2 464, 466, 468, 470, 472, and 474. A first half of the transmitted CSI-RS at times T2 464, 468, and 472 occur during a DRX ON duration, respectively during times T0 452, 454, and 456. A second half of the transmitted CSI-RS are received by the UE at times T2 466, 470, and 474 during DRX OFF duration. In an example, the signal quality of the periodic CSI-RS transmitted at times T2 464, 466, 468, 472, and 474 may be below a threshold and the signal quality of the periodic CSI-RS transmitted at T2 470 may be above the threshold. In this example, the UE monitors the periodic CSI-RS for beam failure detection during a DRX ON duration T0 452, 454, and 456. At each beam failure instance period, one CSI-RS is respectively monitored at times T2 464, 468, and 472. As the signal quality of the monitored CSI-RS is determined to be below the radio link quality threshold, the physical layer of the UE indicates three consecutive beam failure instances to the higher layers. In response, the higher layer declares a beam failure. It is noted that even though the signal quality of one CSI-RS transmitted at time T2 470 is above the radio link quality threshold, as this CSI-RS does not occur during a DRX ON period and that the UE does not monitor this CSI-RS, the signal quality of this CSI-RS is not considered in determining beam failure.

Figure 9:
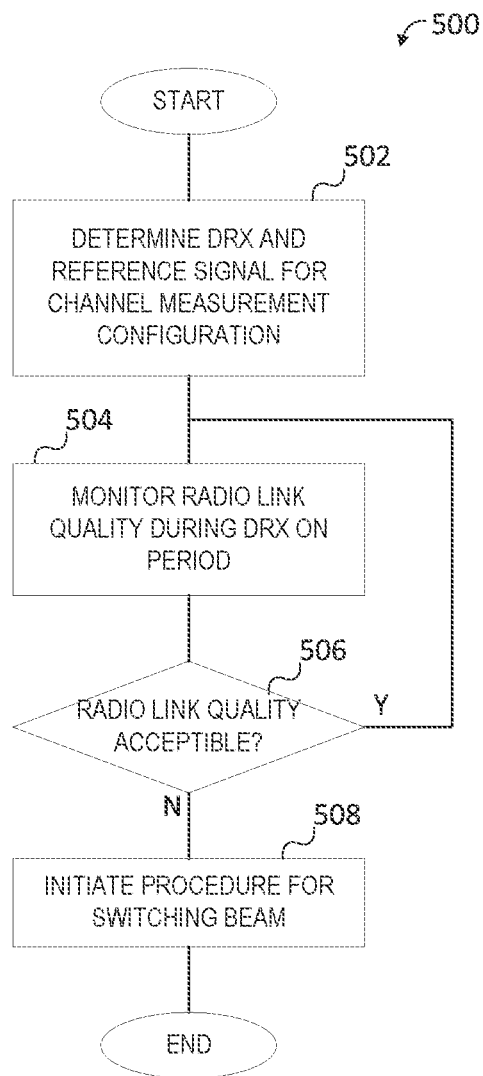
FIG. 9 is a flow chart of an embodiment method for operating a UE in a beam failure recovery operation.

FIG. 9 is a flowchart of an embodiment method 500 for beam failure recovery as may be performed by a UE. The embodiment method may be indicative of operations occurring within a UE, such as a physical (PHY) layer or MAC layer entity of the UE. At step 502, the UE receives a message from a base station that includes information on the configuration of a DRX mode and frame or reference signals for channel measurement. In accordance with this configuration information, the UE identifies the DRX operating mode and the frame or reference signals used to assess the channel quality of a PDCCH. The reference signals may be a set of reference signals agreed by both the UE and a base station for channel measurement configuration. The reference signal for channel measurement can be scheduled to be periodic or semi-static. In an embodiment, the DRX configuration and/or the reference signals can be setup simultaneously using a radio resource control (RRC) message. In another embodiment, the DRX configuration and/or the reference signals can be setup using different RRC messages.

At step 504, the UE, operating in the DRX mode in accordance with step 502, monitors the radio link quality of the PDCCH and/or the communication beam only during the DRX ON period of the DRX mode cycle. At step 506, in one embodiment, the UE determines whether the frame is received only during the DRX ON state of the UE and whether the quality of the PDCCH is less than a quality threshold. In another embodiment, the UE determines whether the reference signals are received only during the DRX On state of the UE and whether the quality of the communication beam is less than a quality threshold. At step 508, if the UE determines that the radio link quality is less than the quality threshold, for the frame or reference signals received only during the DRX ON state, the UE transmits a recovery message to a base station indicating a change to a communication beam used to receive the frame. Alternatively, the UE may initiate a procedure for switching from the current beam used for PDCCH reception to a new beam. In one embodiment, the initiation of the switching beam procedure includes a transmission of a PRACH for beam failure recovery. However, if the radio link quality is determined to be acceptable, the UE resumes the monitoring of the radio link quality at the next DRX ON period of the DRX cycle.

Without loss of generality, it is noted that even though some of the example embodiments above explain the operation of one or more receive RF chains for downlink transmissions, similar mechanisms may be applied to one or more transmit RF chains for uplink transmission from a UE. It is also noted that even though some of the example embodiments above explain the proposed operation under a general DRX operation case, similar mechanisms may be applied to the case when DRX operation includes both Long DRX cycles and Short DRX cycles or to the case when DRX operation includes Long DRX cycles.

In some embodiments where the UE operation is noted, in a non-limiting example, to be operating in a Long DRX Cycle, it is noted that this can be extended to cases when the UE is configured to be operating in both Long DRX Cycle and Short DRX Cycle. When both Long DRX Cycle and Short DRX Cycle are configured, a UE may assess the radio link quality in accordance with periodic CSI-RS resource configurations or SS/PBCH blocks that are quasi co-located with the DM-RS of PDCCH receptions monitored by the UE during a DRX ON period for both the Long DRX Cycle and the Short DRX Cycle. When both Long DRX Cycle and Short DRX Cycle are configured, a UE may assess the radio link quality in accordance to periodic CSI-RS resource configurations or SS/PBCH blocks that are quasi co-located with the DM-RS of PDCCH receptions monitored by the UE during a DRX ON period for Long DRX Cycle. It should also be noted that a DRX ON period may imply DRX ON period for a Long DRX Cycle and a DRX ON period for a Short DRX Cycle. And a DRX OFF period may imply DRX OFF period for a Long DRX Cycle and a DRX OFF period for a Short DRX Cycle.

FIG. 10 illustrates an example communication system 550. In general, the system 550 enables multiple wireless or wired users to transmit and receive data and other content. The system 550 may implement one or more channel access methods, such as code division multiple access (CDMA), time division multiple access (TDMA), frequency division multiple access (FDMA), orthogonal FDMA (OFDMA), single-carrier FDMA (SC-FDMA), or non-orthogonal multiple access (NOMA). In this example, the communication system 550 includes electronic devices (ED) 552*a*-552*c*, radio access networks (RANs) 554*a*-554*b*, a core network 556, a public switched telephone network (PSTN) 558, the Internet 560, and other networks 562. While certain numbers of these components or elements are shown in FIG. 10, any number of these components or elements may be included in the system 550. The EDs 552*a*-552*c* are configured to operate or communicate in the system 550.

For example, the EDs 552*a*-552*c* are configured to transmit or receive via wireless or wired communication channels. Each ED 552*a*-552*c* represents any suitable end user device and may include such devices (or may be referred to) as a user equipment or device (UE), wireless transmit or receive unit (WTRU), mobile station, fixed or mobile subscriber unit, cellular telephone, personal digital assistant (PDA), smartphone, laptop, computer, touchpad, wireless sensor, or consumer electronics device. The RANs 554*a*-554*b* here include base stations 564*a*-564*b*, respectively. Each base station 564*a*-564*b* is configured to wirelessly interface with one or more of the EDs 552*a*-552*c* to enable access to the core network 556, the PSTN 558, the Internet 560, or the other networks 562. For example, the base stations 564*a*-564*b* may include (or be) one or more of several well-known devices, such as a base transceiver station (BTS), a Node-B (NodeB), an evolved NodeB (eNodeB), a Next Generation (NG) NodeB (gNB), a Home NodeB, a Home eNodeB, a site controller, an access point (AP), or a wireless router. The EDs 552*a*-552*c* are configured to interface and communicate with the Internet 560 and may access the core network 556, the PSTN 558, or the other networks 562. In this embodiment, the base station 564*a* forms part of the RAN 554*a*, which may include other base stations, elements, or devices. Also, the base station 564*b* forms part of the RAN 554*b*, which may include other base stations, elements, or devices. Each base station 564*a*-564*b* operates to transmit or receive wireless signals within a particular geographic region or area, sometimes referred to as a "cell."

In some embodiments, multiple-input multiple-output (MIMO) technology may be employed having multiple transceivers for each cell. The base stations 564*a*-564*b* communicate with one or more of the EDs 552*a*-552*c* over one or more air interfaces 566 using wireless communication links. The air interfaces 566 may utilize any suitable radio access technology. It is contemplated that the system 550 may use multiple channel access functionality, including such schemes as described above. In particular embodiments, the base stations and EDs implement 5G New Radio (NR), LTE, LTE-A, or LTE-B. Of course, other multiple access schemes and wireless protocols may be utilized. The RANs 554a-554b are in communication with the core network 556 to provide the EDs 552a-552c with voice, data, application, Voice over Internet Protocol (VoIP), or other services. Understandably, the RANs 554a-554b or the core network 556 may be in direct or indirect communication with one or more other RANs (not shown). The core network 556 may also serve as a gateway access for other networks (such as the PSTN 558, the Internet 560, and the other networks 562). In addition, some or all of the EDs 552a-552c may include functionality for communicating with different wireless networks over different wireless links using different wireless technologies or protocols. Instead of wireless communication (or in addition thereto), the EDs may communicate via wired communication channels to a service provider or switch (not shown), and to the Internet 560.

Although FIG. 10 illustrates one example of a communication system, various changes may be made to FIG. 10. For example, the communication system 550 could include any number of EDs, base stations, networks, or other components in any suitable configuration.

FIGS. 11A-B illustrate example devices that may implement the methods and teachings according to this disclosure. In particular, FIG. 1A illustrates an example ED 610, and FIG. 1B illustrates an example base station 620. These components could be used in the system 550 or in any other suitable system. As shown in FIG. 1A, the ED 610 includes at least one processing unit 600. The processing unit 600 implements various processing operations of the ED 610. For example, the processing unit 600 could perform signal coding, data processing, power control, input/output processing, or any other functionality enabling the ED 610 to operate in the system 550. The processing unit 600 also supports the methods and teachings described in more detail above. Each processing unit 600 includes any suitable processing or computing device configured to perform one or more operations. Each processing unit 600 could, for example, include a microprocessor, a microcontroller, a digital signal processor, a field programmable gate array (FPGA), or an application specific integrated circuit (ASIC). The ED 610 also includes at least one transceiver 602. The transceiver 602 is configured to modulate data or other content for transmission by at least one antenna or Network Interface Controller (NIC) 604. The transceiver 602 is also configured to demodulate data or other content received by the at least one antenna 604. Each transceiver 602 includes any suitable structure for generating signals for wireless or wired transmission or processing signals received wirelessly or by wire. Each antenna 604 includes any suitable structure for transmitting or receiving wireless or wired signals 632. One or multiple transceivers 602 could be used in the ED 610, and one or multiple antennas 604 could be used in the ED 610.

Although shown as a single functional unit, a transceiver 602 could also be implemented using at least one transmitter and at least one separate receiver. The ED 610 further includes one or more input/output devices 606 or interfaces (such as a wired interface to the Internet 560). The input/output devices 606 facilitate interaction with a user or other devices (network communications) in the network. Each input/output device 606 includes any suitable structure for providing information to or receiving information from a user, such as a speaker, microphone, keypad, keyboard, display, or touch screen, including network interface communications.

In addition, the ED 610 includes at least one memory 608. The memory 608 stores instructions and data used, generated, or collected by the ED 610. For example, the memory 608 could store software or firmware instructions executed by the processing unit(s) 600 and data used to reduce or eliminate interference in incoming signals. Each memory 608 includes any suitable volatile or non-volatile storage and retrieval device(s). Any suitable type of memory may be used, such as random access memory (RAM), read only memory (ROM), hard disk, optical disc, subscriber identity module (SIM) card, memory stick, secure digital (SD) memory card, and the like.

As shown in FIG. 11B, the base station 620 includes at least one processing unit 622, at least one transceiver 624, which includes functionality for a transmitter and a receiver, one or more antennas 630, at least one memory 628, and one or more input/output devices or interfaces 626. A scheduler, which would be understood by one skilled in the art, is coupled to the processing unit 622. The scheduler could be included within or operated separately from the base station 620. The processing unit 622 implements various processing operations of the base station 620, such as signal coding, data processing, power control, input/output processing, or any other functionality. The processing unit 622 can also support the methods and teachings described in more detail above. Each processing unit 622 includes any suitable processing or computing device configured to perform one or more operations. Each processing unit 622 could, for example, include a microprocessor, a microcontroller, a digital signal processor, a field programmable gate array (FPGA), or an application specific integrated circuit (ASIC). Each transceiver 624 includes any suitable structure for generating signals for wireless or wired transmission to one or more EDs or other devices. Each transceiver 624 further includes any suitable structure for processing signals received wirelessly or by wire from one or more EDs or other devices. Although shown combined as a transceiver 624, a transmitter and a receiver could be separate components. Each antenna 630 includes any suitable structure for transmitting or receiving wireless or wired signals 632. While a common antenna 630 is shown here as being coupled to the transceiver 624, one or more antennas 630 could be coupled to the transceiver(s) 624, allowing separate antennas 630 to be coupled to the transmitter and the receiver if equipped as separate components. Each memory 628 includes any suitable volatile or non-volatile storage and retrieval device(s). Each input/output device 626 facilitates interaction with a user or other devices (network communications) in the network. Each input/output device 626 includes any suitable structure for providing information to or receiving/providing information from a user, including network interface communications.

Figure 12:
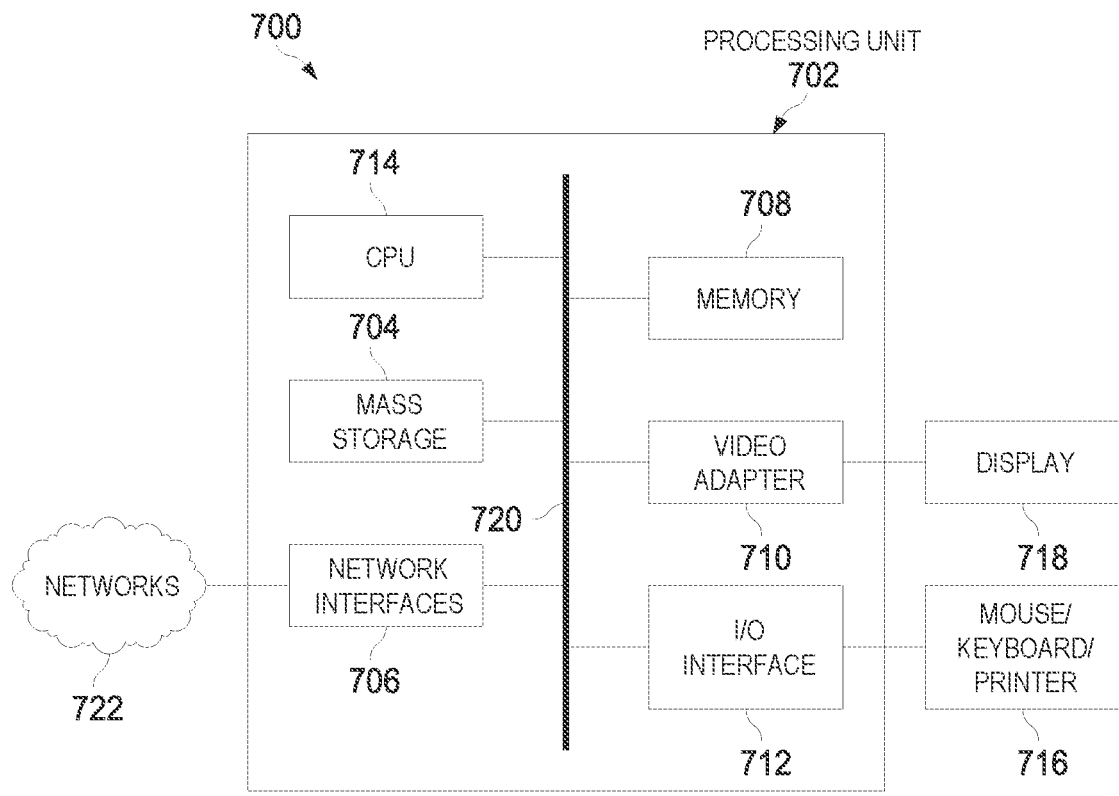
FIG. 12 is a diagram of an embodiment computing system.

FIG. 12 is a block diagram of a computing system 700 that may be used for implementing the devices and methods disclosed herein. For example, the computing system can be any entity of UE, access network (AN), mobility management (MM), session management (SM), user plane gateway (UPGW), or access stratum (AS). Specific devices may utilize all of the components shown or a subset of the components, and levels of integration may vary from device to device. Furthermore, a device may contain multiple instances of a component, such as multiple processing units, processors, memories, transmitters, receivers, etc. The computing system 700 includes a processing unit 702. The processing unit includes a central processing unit (CPU) 714, memory 708, and may further include a mass storage device 704, a video adapter 710, and an I/O interface 712 connected to a bus 720. The bus 720 may be one or more of any type of several bus architectures including a memory bus or memory controller, a peripheral bus, or a video bus. The CPU 714 may include any type of electronic data processor. The memory 708 may include any type of non-transitory system memory such as static random access memory (SRAM), dynamic random access memory (DRAM), synchronous DRAM (SDRAM), read-only memory (ROM), or a combination thereof. In an embodiment, the memory 708 may include ROM for use at boot-up, and DRAM for program and data storage for use while executing programs. The mass storage 704 may include any type of non-transitory storage device configured to store data, programs, and other information and to make the data, programs, and other information accessible via the bus 720. The mass storage 704 may include, for example, one or more of a solid-state drive, hard disk drive, a magnetic disk drive, or an optical disk drive. The video adapter 710 and the I/O interface 712 provide interfaces to couple external input and output devices to the processing unit 702.

As illustrated, examples of input and output devices include a display 718 coupled to the video adapter 710 and a mouse, keyboard, or printer 716 coupled to the I/O interface 712. Other devices may be coupled to the processing unit 702, and additional or fewer interface cards may be utilized. For example, a serial interface such as Universal Serial Bus (USB) (not shown) may be used to provide an interface for an external device. The processing unit 702 also includes one or more network interfaces 706, which may include wired links, such as an Ethernet cable, or wireless links to access nodes or different networks. The network interfaces 706 allow the processing unit 702 to communicate with remote units via the networks. For example, the network interfaces 706 may provide wireless communication via one or more transmitters/transmit antennas and one or more receivers/receive antennas.

In an embodiment, the processing unit 702 is coupled to a local-area network 722 or a wide-area network for data processing and communications with remote devices, such as other processing units, the Internet, or remote storage facilities. It should be appreciated that one or more steps of the embodiment methods provided herein may be performed by corresponding units or modules. For example, a signal may be transmitted by a transmitting unit or a transmitting module. A signal may be received by a receiving unit or a receiving module. A signal may be processed by a processing unit or a processing module. Other steps may be performed by a determining unit or module, a reporting unit or module, an incrementing unit or module, a declaring unit or module, an updating unit or module, a resetting unit or module, a detecting unit or module, or a monitoring unit or module. The respective units or modules may be hardware, software, or a combination thereof. For instance, one or more of the units or modules may be an integrated circuit, such as field programmable gate arrays (FPGAs) or application-specific integrated circuits (ASICs).

Figure 13:
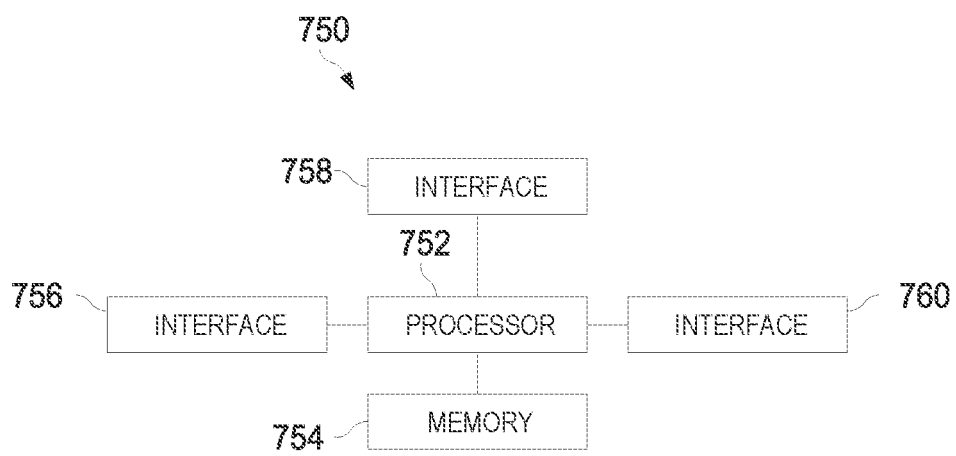
FIG. 13 is a diagram of an embodiment processing system.

FIG. 13 illustrates a block diagram of an embodiment processing system 750 for performing methods described herein, which may be installed in a host device. As shown, the processing system 750 includes a processor 752, a memory 754, and interfaces 756, 758, 760 which may (or may not) be arranged as shown in FIG. 13. The processor 752 may be any component or collection of components adapted to perform computations and/or other processing related tasks, and the memory 754 may be any component or collection of components adapted to store programming and/or instructions for execution by the processor 752. In an embodiment, the memory 754 includes a non-transitory computer readable medium. The interfaces 756, 758, 760 may be any component or collection of components that allow the processing system 750 to communicate with other devices/components and/or a user. For embodiment, one or more of the interfaces 756, 758, 760 may be adapted to communicate data, control, or management messages from the processor 752 to applications installed on the host device and/or a remote device. As another embodiment, one or more of the interfaces 756, 758, 760 may be adapted to allow a user or user device (e.g., personal computer (PC), etc.) to interact/communicate with the processing system 750. The processing system 750 may include additional components not depicted in FIG. 13, such as long-term storage (e.g., non-volatile memory, etc.).

In some embodiments, the processing system 750 is included in a network device that is accessing, or part otherwise of, a telecommunications network. In one embodiment, the processing system 750 is in a network-side device in a wireless or wireline telecommunications network, such as a base station, a relay station, a scheduler, a controller, a gateway, a router, an applications server, or any other device in the telecommunications network. In other embodiments, the processing system 750 is in a user-side device accessing a wireless or wireline telecommunications network, such as a mobile station, a user equipment (UE), a personal computer (PC), a tablet, a wearable communications device (e.g., a smartwatch, etc.), a wireless capable vehicle, a wireless capable pedestrian, a wireless capable infrastructure element or any other device adapted to access a telecommunications network.

In some embodiments, one or more of the interfaces 756, 758, 760 connects the processing system 750 to a transceiver adapted to transmit and receive signaling over the telecommunications network.

Figure 14:
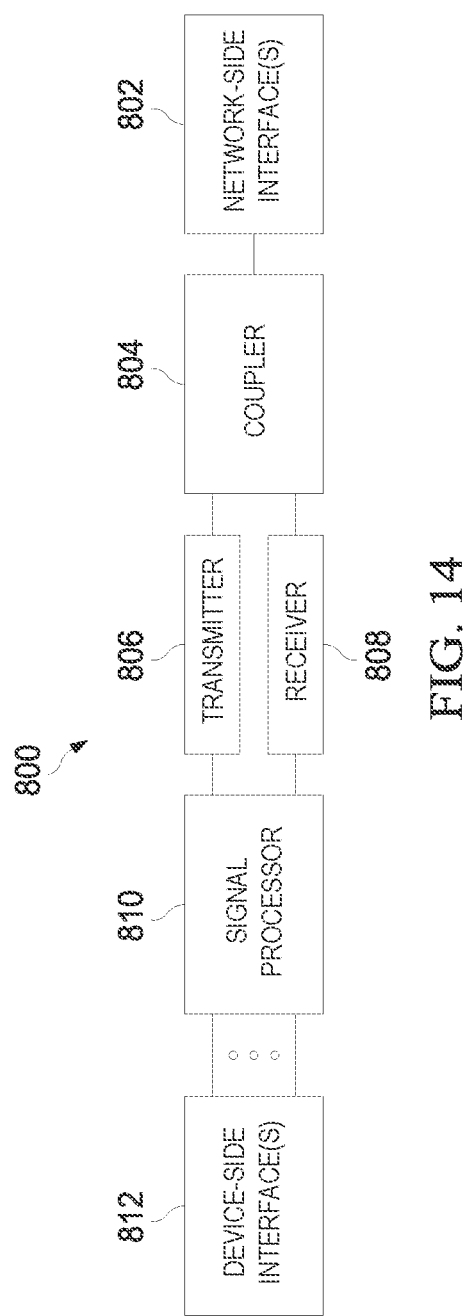
FIG. 14 is a diagram of an embodiment transceiver.

FIG. 14 illustrates a block diagram of a transceiver 800 adapted to transmit and receive signaling over a telecommunications network. The transceiver 800 may be installed in a host device. As shown, the transceiver 800 includes a network-side interface 802, a coupler 804, a transmitter 806, a receiver 808, a signal processor 810, and a device-side interface 812. The network-side interface 802 may include any component or collection of components adapted to transmit or receive signaling over a wireless or wireline telecommunications network. The coupler 804 may include any component or collection of components adapted to facilitate bi-directional communication over the network-side interface 802. The transmitter 806 may include any component or collection of components (e.g., up-converter, power amplifier, etc.) adapted to convert a baseband signal into a modulated carrier signal suitable for transmission over the network-side interface 802. The receiver 808 may include any component or collection of components (e.g., down-converter, low noise amplifier, etc.) adapted to convert a carrier signal received over the network-side interface 802 into a baseband signal. The signal processor 810 may include any component or collection of components adapted to convert a baseband signal into a data signal suitable for communication over the device-side interface(s) 812, or vice-versa. The device-side interface(s) 812 may include any component or collection of components adapted to communicate data-signals between the signal processor 810 and components within the host device (e.g., the processing system 750, local area network (LAN) ports, etc.). The transceiver 800 may transmit and receive signaling over any type of communications medium. In some embodiments, the transceiver 800 transmits and receives signaling over a wireless medium. In some embodiments, the transceiver 800 may be a wireless transceiver adapted to communicate in accordance with a wireless telecommunications protocol, such as a cellular protocol (e.g., long-term evolution (LTE), etc.), a wireless local area network (WLAN) protocol (e.g., Wi-Fi, etc.), or any other type of wireless protocol (e.g., Bluetooth, near field communication (NFC), etc.). In such embodiments, the network-side interface 802 includes one or more antenna/radiating elements.

In some embodiments, the network-side interface 802 may include a single antenna, multiple separate antennas, or a multi-antenna array configured for multi-layer communication, e.g., single input multiple output (SIMO), multiple input single output (MISO), multiple input multiple output (MIMO), etc. In other embodiments, the transceiver 800 transmits and receives signaling over a wireline medium, e.g., twisted-pair cable, coaxial cable, optical fiber, etc. Specific processing systems and/or transceivers may utilize all of the components shown, or only a subset of the components, and levels of integration may vary from device to device.

In some embodiments, a receive radio frequency (RF) chain, a receive chain, a receive paths disclosure may imply a RF chain for a receive path and/or a RF and a digital circuit related to a receive path. In some embodiments, a transmit chain or a transmit path in this disclosure may imply a RF chain for a transmit path and/or a RF and a digital circuit related to a transmit path.

In some embodiments, a beam may be a pre-defined set of beamforming weights in the context of codebook-based precoding or a dynamically defined set of beamforming weights in the context of non-codebook based precoding (e.g., Eigen-based beamforming (EBB)). In some embodiments, a beam may also be a pre-defined set of phase shift preprocessors combining signals from the antenna array in the radio frequency (RF) domain. It should be appreciated that a UE may rely on codebook-based precoding to transmit uplink signals and receive downlink signals, while a TRP may rely on non-codebook based precoding to form certain radiation patterns to transmit downlink signals and/or receive uplink signals.

Although the description has been described in detail, it should be understood that various changes, substitutions, and alterations may be made without departing from the spirit and scope of this disclosure as defined by the appended claims. The same elements are designated with the same reference numbers in the various figures. Moreover, the scope of the disclosure is not intended to be limited to the particular embodiments described herein, as one of ordinary skill in the art will readily appreciate from this disclosure that processes, machines, manufacture, compositions of matter, means, methods, or steps, presently existing or later to be developed, may perform substantially the same function or achieve substantially the same result as the corresponding embodiments described herein. Accordingly, the appended claims are intended to include within their scope such processes, machines, manufacture, compositions of matter, means, methods, or steps.

The specification and drawings are, accordingly, to be regarded simply as an illustration of the disclosure as defined by the appended claims, and are contemplated to cover any and all modifications, variations, combinations, or equivalents that fall within the scope of the present disclosure.

What is claimed is:

1. A method for beam recovery by a user equipment (UE) operating in a discontinuous reception (DRX) mode, the method comprising:
   receiving, by the UE, a channel state information-reference signal (CSI-RS) or a synchronization signal (SS)/physical broadcast channel (PBCH) block;
   determining, by the UE, both that the CSI-RS or the SS/PBCH block is received while the UE is operating in a DRX ON state of the DRX mode and that a quality of the CSI-RS or the SS/PBCH block is less than a quality threshold, the CSI-RS or the SS/PBCH block quasi co-located with a demodulation-reference signal (DM-RS) of a physical downlink control channel (PDCCH); and based thereon
   transmitting, by the UE, a recovery message to a base station indicating a change to a communication beam associated with the CSI-RS or the SS/PBCH block.

2. The method of claim 1, wherein a frame includes the CSI-RS or the SS/PBCH block, wherein the frame further comprises a downlink control indicator (DCI) message received over the PDCCH, and wherein the DCI message is scrambled using cyclic redundancy check (CRC) parity bits, a radio network temporary identifier (RNTI) assigned to the UE, and a channel measurement mask.

3. The method of claim 2, further comprising:
   decoding, by the UE, the DCI message using the channel measurement mask, wherein the channel measurement mask is a first channel measurement mask, and wherein a successful decoding of the DCI message using the first channel measurement mask indicates to the UE to only measure the quality of the PDCCH.

4. The method of claim 2, further comprising:
   decoding, by the UE, the DCI message using the channel measurement mask, wherein the channel measurement mask is a second channel measurement mask, wherein a successful decoding of the DCI message using the second channel measurement mask indicates to the UE to measure the quality of the PDCCH, and wherein the DCI message includes a payload for scheduling an uplink message, an instruction for scheduling a downlink message, or a combination thereof.

5. The method of claim 1, wherein the CSI-RS or the SS/PBCH block is received at a beginning of the DRX ON state of the DRX mode.

6. The method of claim 1, wherein the communication beam is beam pair link (BPL) between a transmitting beam of the base station and a receiving beam of the UE.

7. The method of claim 1, wherein the DRX ON state of the DRX mode has a long DRX cycle.

8. The method of claim 1, wherein the DRX ON state of the DRX mode has a short DRX cycle.

9. The method of claim 1, wherein the DRX ON state is a time period that a media access control (MAC) entity of the UE is in Active Time.

10. The method of claim 1, wherein the DRX ON state is a time period starting from a predetermined time prior to a media access control (MAC) entity of the UE being in Active Time and ending at a time that the MAC entity of the UE is no longer in the Active Time.

11. A user equipment (UE) operating in a discontinuous reception (DRX) mode, the UE comprising:
at least one processor; and
at least one non-transitory computer readable storage medium storing programming for execution by the at least one processor, the programming including instructions to cause the UE to perform operations including:
receiving a channel state information-reference signal (CSI-RS) or a synchronization signal (SS)/physical broadcast channel (PBCH) block;
determining both that the CSI-RS or the SS/PBCH block is received while the UE is operating in a DRX ON state of the DRX mode and that a quality of the CSI-RS or the SS/PBCH block is less than a quality threshold, the CSI-RS or the SS/PBCH block quasi co-located with a demodulation-reference signal (DM-RS) of a physical downlink control channel (PDCCH); and based thereon
transmitting a recovery message to a base station indicating a change to a communication beam associated with the CSI-RS or the SS/PBCH block.

12. The UE of claim 11, wherein a frame includes the CSI-RS or the SS/PBCH block, and wherein the communication beam is beam pair link (BPL) between a transmitting beam of the base station and a receiving beam of the UE.

13. A method for beam recovery in a wireless communication, the method comprising:
receiving, by a user equipment (UE) operating in a discontinuous reception (DRX) mode, reference signals, the reference signals being quasi co-located with a physical downlink control channel (PDCCH), the reference signals including a synchronization signal (SS)/physical broadcast channel (PBCH) block quasi co-located with a demodulation-reference signal (DM-RS) of the PDCCH; and
determining, by the UE, both that the reference signals including the SS/PBCH block are received while the UE is operating in a DRX ON state of the DRX mode and that a quality of the reference signals is less than a quality threshold; and based thereon
transmitting, by the UE, a recovery message to a base station indicating a change to a different communication beam to be used by the PDCCH.

14. The method of claim 13, wherein the DRX ON state is a time period that a media access control (MAC) entity of the UE is in Active Time.

15. The method of claim 13, wherein the DRX ON state is a time period starting from a predetermined time prior to a media access control (MAC) entity of the UE being in Active Time and ending at a time that the MAC entity of the UE is no longer in the Active Time.

16. The method of claim 13, wherein the reference signals are received at a beginning of the DRX ON state of the DRX mode.

17. The method of claim 13, wherein the DRX ON state of the DRX mode has a long DRX cycle.

18. The method of claim 13, wherein the DRX ON state of the DRX mode has a short DRX cycle.

19. The method of claim 13, wherein a communication beam used by the PDCCH is beam pair link (BPL) between a transmitting beam of the base station and a receiving beam of the UE.

20. A user equipment (UE) operating in a discontinuous reception (DRX) mode, the UE comprising:
at least one processor; and
at least one non-transitory computer readable storage medium storing programming for execution by the at least one processor, the programming including instructions to cause the UE to perform operations including:
receiving reference signals, the reference signals being quasi co-located with a physical downlink control channel (PDCCH), the reference signals including a synchronization signal (SS)/physical broadcast channel (PBCH) block quasi co-located with a demodulation-reference signal (DM-RS) of the PDCCH; and
determining both that the reference signals including the SS/PBCH block are received while the UE is operating in a DRX ON state of the DRX mode and that a quality of the reference signals is less than a quality threshold; and based thereon
transmitting a recovery message to a base station indicating a change to a different communication beam to be used by the PDCCH.

21. The UE of claim 20, wherein a communication beam used by the PDCCH is beam pair link (BPL) between a transmitting beam of the base station and a receiving beam of the UE.

* * * * *